April 7, 1964 W. V. WENGER 3,127,860
FABRICATION OF HOLLOW ARTICLES
Filed June 23, 1959 5 Sheets-Sheet 1
FIG. 1
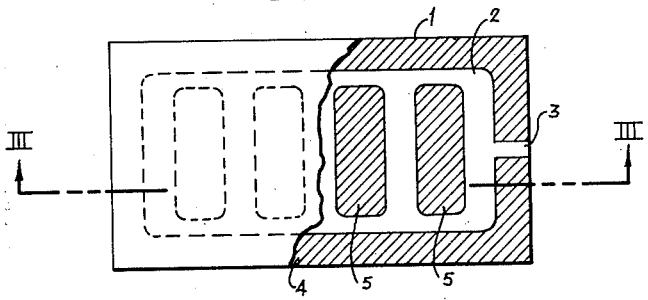
FIG. 3
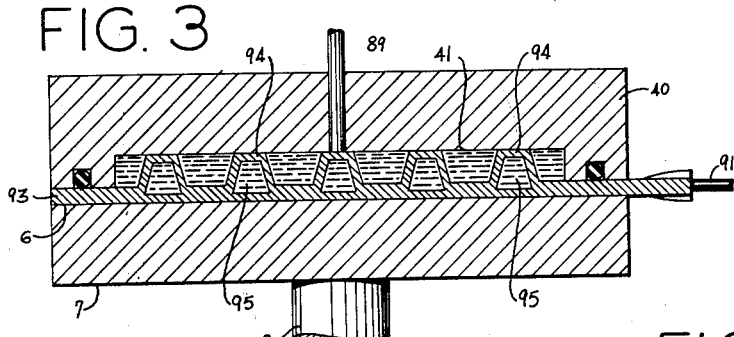
FIG. 6
FIG. 4
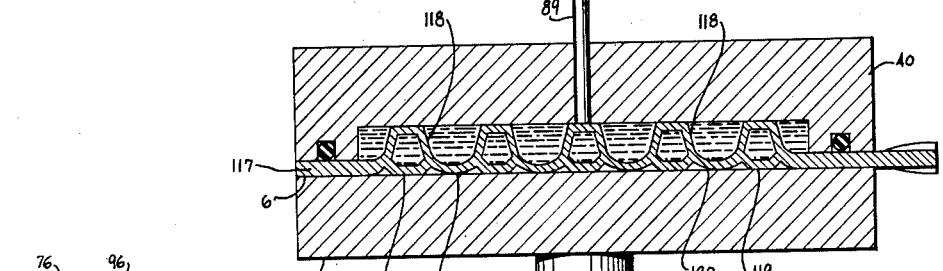
INVENTOR.
WILLIAM VERNON WENGER
BY
ATTORNEYS

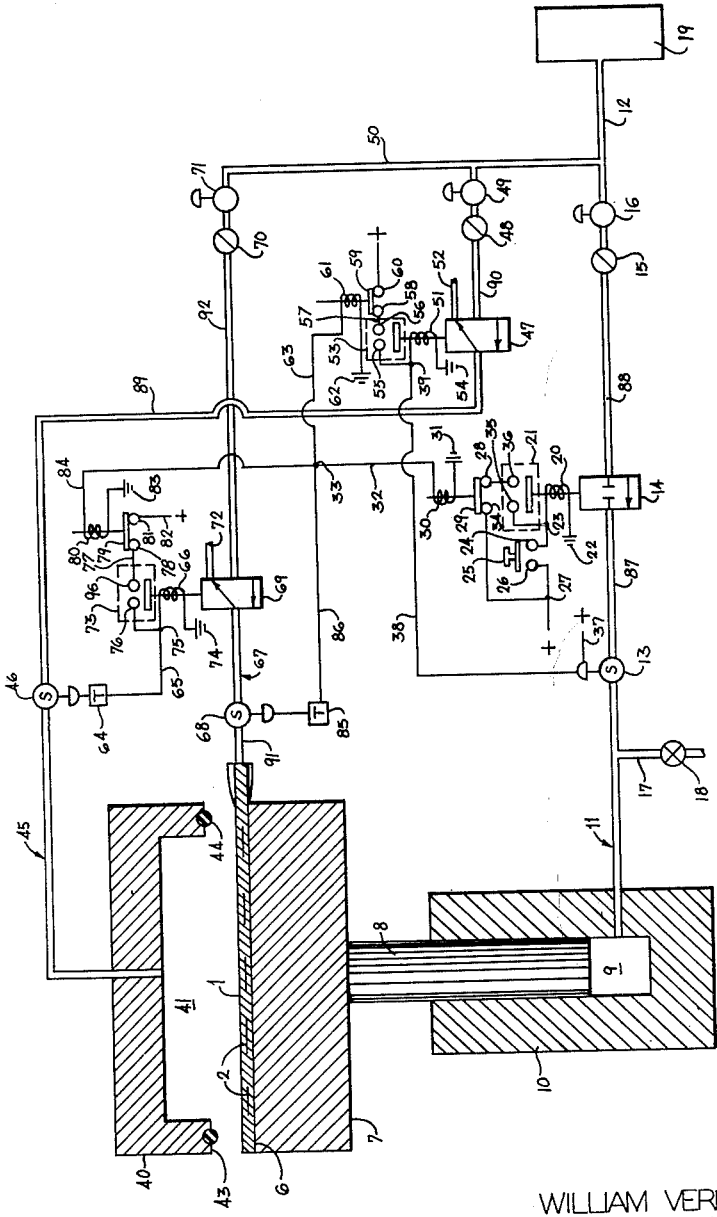

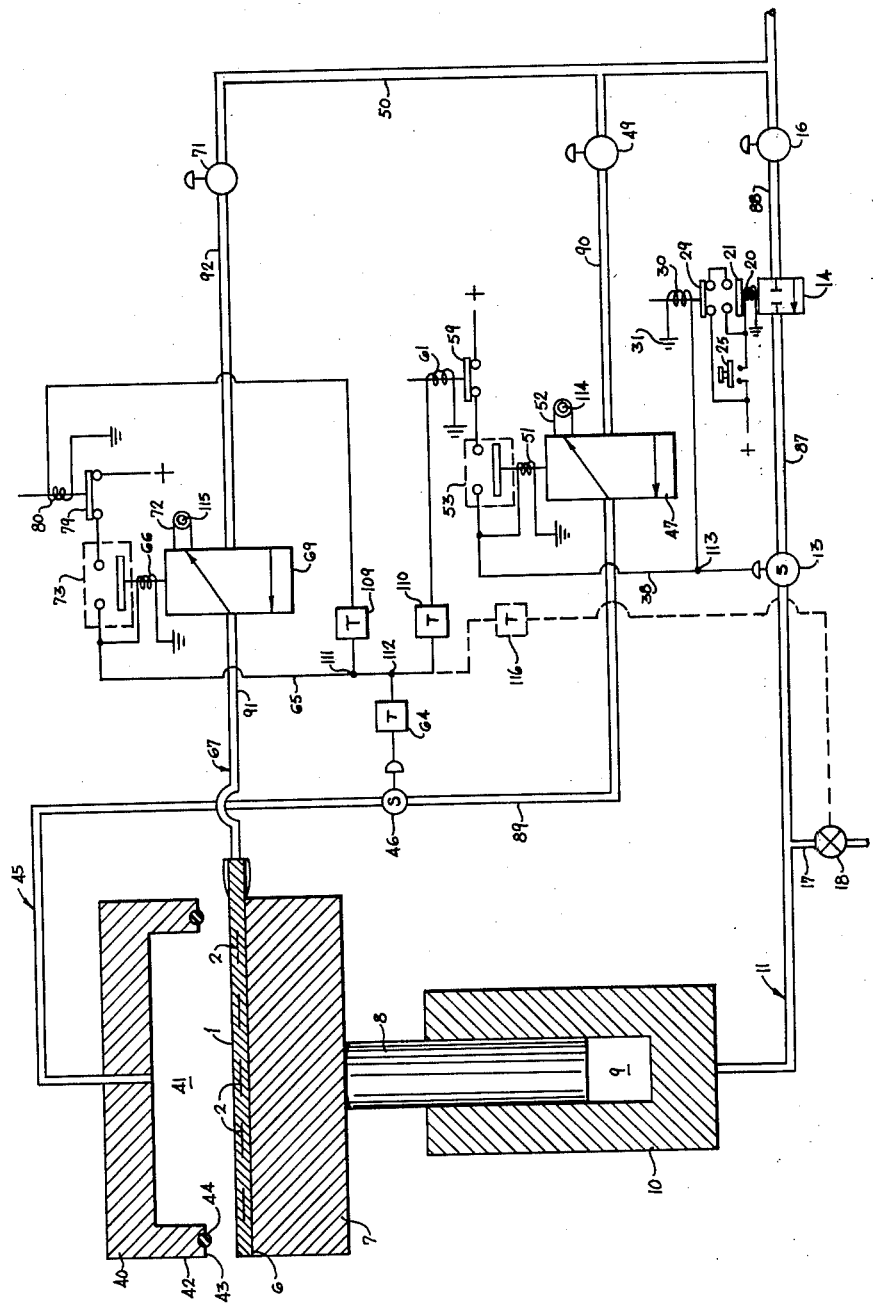

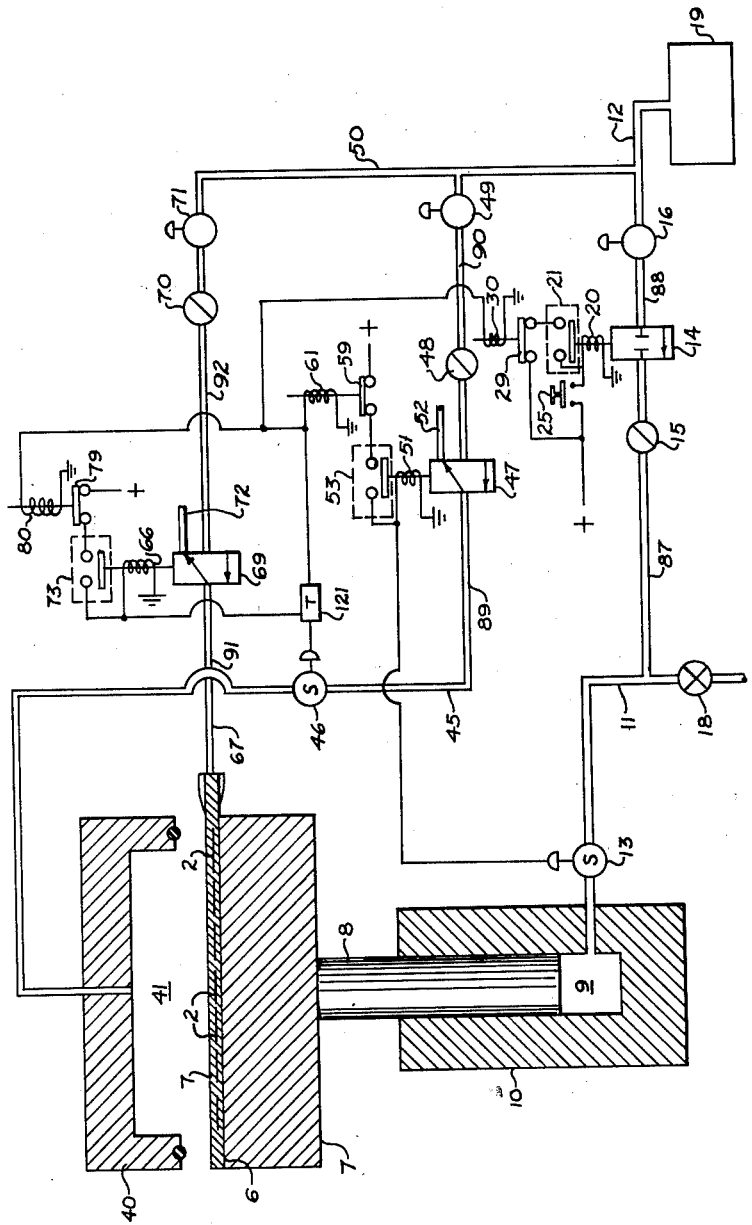

April 7, 1964  W. V. WENGER  3,127,860
FABRICATION OF HOLLOW ARTICLES
Filed June 23, 1959  5 Sheets-Sheet 5
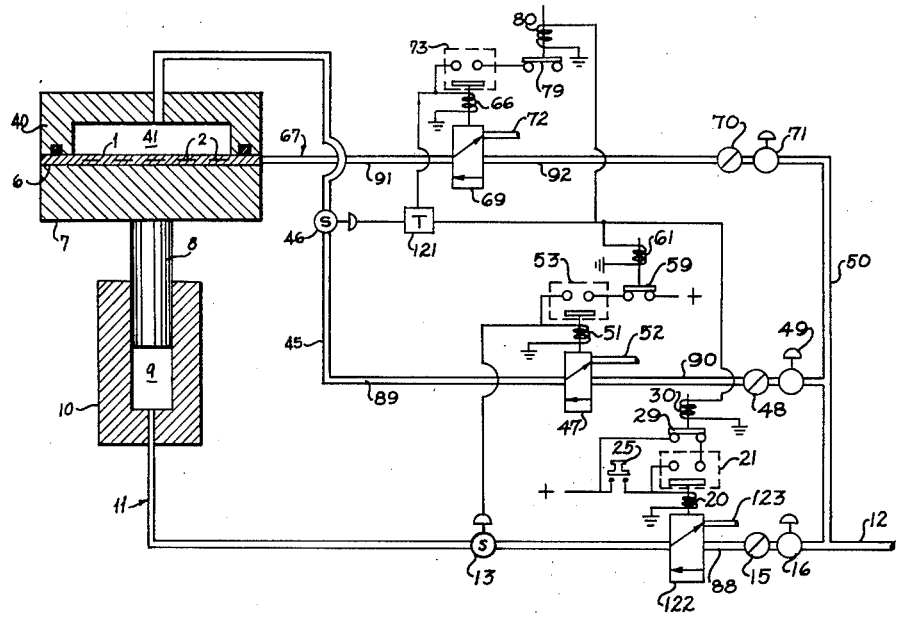
INVENTOR.
WILLIAM VERNON WENGER
BY
ATTORNEYS

United States Patent Office 3,127,860
Patented Apr. 7, 1964

3,127,860
FABRICATION OF HOLLOW ARTICLES
William Vernon Wenger, Alton, Ill., assignor to Olin Mathieson Chemical Corporation, East Alton, Ill., a corporation of Virginia
Filed June 23, 1959, Ser. No. 822,290
6 Claims. (Cl. 113—44)

This invention relates to the fabrication of hollow articles by expansion of sheet-like material and more particularly to a novel means for controlling the amount of expansion from each face of the aforesaid sheet-like articles.

The hollow sheet-like material preferably in the form of sheet metal panels may be fabricated in accordance with various methods but are most advantageously and preferably made by a process such as described in U.S. Patent No. 2,690,002, issued to Grenell on September 28, 1954.

In accordance with the process of the aforesaid patent to Grenell, a pattern of weld-inhibiting material is applied to a clean surface of a sheet of metal. A clean surface of a second sheet of metal is superimposed on this surface and the two sheets are secured to prevent relative movement between each other and then pressure-welded together, as by hot rolling, in their adjacent areas which are not separated by the weld-inhibiting material. Hot rolling of the sheets results in reducing the thickness of the two sheets and elongating the resultant blank in the direction of rolling while the width of the resultant blank remains substantially the same as the initial width of the sheets. Following the pressure-welding operation, the resultant blank can be softened as by annealing to make it more pliable, and if desired, it may then be cold rolled to final gauge and again softened as by annealing. The application of weld-inhibiting material results in an unjoined portion of a pattern of laminations between the outer faces of the pressure-welded blank. Any time after pressure-welding of the blank, and preferably after softening by annealing, the unjoined portion or pattern of laminations is distended by injecting therein a fluid pressure of sufficient magnitude to permanently expand the blank in the area of the unjoined portion or pattern of laminations to form a desired corresponding system of passageways.

One method of expanding a blank may be accomplished by subjecting the blank to external confinement between at least one rigid die member and a body of fluid, under pressure, applied externally to only one side of the blank. One of the rigid die members in the form of a press platen with a suitably shaped die surface, such as a flat one in particular, on one side of the blank while the fluid, and preferably a suitable incompressible liquid, such as water, oil or the like, acts on the other side of the blank so as to constrain it between the die surface and the fluid or liquid during the application of a blank-expanding fluid pressure injected internally of the blank into the unjoined portion or pattern of laminations. This fluid or liquid acting externally of the blank may be contained within a recess or cavity in a second rigid die member to act in conjunction therewith to control the height and the shape of the expanded portions of the blank. Such second rigid die member is ordinarily recessed to a depth corresponding to the final height of the distention desired in the expanded portions of the blank.

Automatic control means have been proposed for the above method of expanding a blank by which the blank-expanding pressure would be injected within the unjoined portion or pattern of laminations in response to a predetermined blank-holding pressure, in the recess or cavity of the secondary die, which acts upon an external surface of the blank to constrain its other surface against the flat or recessed platen. In turn, a means responsive to a predetermined pressure level of the blank-expanding pressure automatically releases both the blank-holding and blank-expanding pressure. However, inherent variables both in the initial method of fabricating the blank and in the aforesaid means for expanding the resultant hollow blank result in malformations occurring in the expanded blank. Such malformations include failure to obtain a substantially flat panel and in a lack of uniform cross-sectional configurations extending throughout the unjoined portion or partial laminations in the blank.

These malformations are caused as a result of a plurality of variables each adding to resultant total malformations of the expanded blank. For example, in the initial application of the pattern of weld-inhibiting material, it is difficult to control the application of weld-inhibiting material so that a uniform thickness thereof is obtained uniformly throughout the pattern. This results in pinpoint welding within the area of the applied pattern of weld-inhibiting material in what is commonly known as "tacking" to produce small points of weak-strength welds. During expansion these pin-point welds require a certain degree of pressure to break these areas loose. Accordingly, where release of the expanding operation is dependent on a predetermined pressure level within the hollow blank, this pressure level may be reached before this tacked area breaks lose causing release of the blank-holding and blank-expanding pressures before the tacked area becomes fully expanded after breaking loose.

Also some of these hollow blanks are provided with a system of laminations having a pattern requiring very narrow and restricted areas. This means that the high pressure, blank-expanding, can build up between a point of entry into the laminations and the restricted area, ofttimes reaching an actuating pressure level which releases the various pressures before the laminations beyond the restriction are fully expanded.

Also these partially laminated blanks are not uniformly flat prior to expansion since irregularities occur therein as for example those which result from manual handling of the blank. Such departure in flatness is generally intended to be removed by the blank-holding pressure which forces the panel flat against the rigid die having the shaped surface, i.e., a flat surface. Thus, when the partially laminated blank is of heavy gauge it has been found that the application of a fluid pressure is required for an appreciable time interval in order to move it and hold it firmly in contact with the shaped surface of the die. However, if conventional teachings are followed so that the operating sequence is dependent on a preceding pressure level, activation of the blank-expanding pressure is reached before heavy gauged partially laminated blanks are completely moved in intimate contact with the shaped surface of the die. Where this happens, it causes premature activation of the blank-expanding pressure beginning expansion of the blank before the heavy gauge metal is moved into intimate contact with the shaped surface die.

Malformations are also caused by fluctuations of fluid pressure in the labyrinth of conduits usually found in conventional presses. These fluctuations can result from rearrangement of fluid flow and pressures during various value arrangements. Thus, for example, when the desired activating level of the blank-holding pressure is reached, although it may actuate the blank-expanding pressure operation, it often also causes a reduction in the level of the blank-holding pressure before the heavy gauge blank is moved in contact with the shaped surface die at the time when expansion of the blank occurs.

Accordingly, it is an object of this invention to eliminate disadvantages of the prior art.

Another object of this invention is to provide a novel means for the application of fluid pressure to enable a more exacting control for the expansion of hollow articles.

A still another object of this invention is to provide a novel means for the application of controlled pressures for producing an improved hollow article.

A still another object of this invention is to provide a novel means for the application of controlled pressures for producing expanded hollow articles having a more uniform cross-sectional configuration throughout the extent of its hollows.

A still another object of this invention is to provide a novel means for the application of pressures for controlling the degree of expansion out of each face of a partially laminated sheet.

A still another object of this invention is to provide a novel means for the application of controlled pressures for producing an improved hollow panel in which the distention occurs on one side only while the other side remains undistended and substantially smooth or flat.

A further object of this invention is to provide a novel means for obtaining an improved hollow panel having a high degree of smoothness and flatness and in which its expanded unjoined hollow portions have throughout a more uniform cross-sectional configuration.

A still further object of this invention is to provide a novel means for the application of controlled pressures to produce a novel hollow article in which one side is distended to a substantially lesser degree than the other side and in which the expanded hollow portions, of the article, have throughout a more uniform cross-sectional configuration.

Other objects and advantages will become more apparent from the following description and drawings in which:

FIGURE 1 is a plan view partly in section of a suitable blank from which a hollow panel is to be formed in accordance with this invention;

FIGURE 2 is a partially sectional view in elevation and a partially schematic view of one embodiment of this invention;

FIGURE 3 is a fragmentary sectional view in elevation illustrating a portion of the blank taken along lines III—III of FIGURE 1 expanded in accordance with this invention;

FIGURE 4 is a partially sectional and schematic view of a means of modifying the apparatus of FIGURE 2 in accordance with another embodiment of this invention;

FIGURE 5 is a partially sectional view and a schematic view of an apparatus illustrating another embodiment of this invention;

FIGURE 6 is a fragmentary sectional view in elevation illustrating a portion of a blank taken along lines III—III of FIGURE 1 expanded into a novel panel in accordance with one aspect of this invention;

FIGURE 7 is still another partially sectional view in elevation and a partially schematic view illustrating an apparatus of still another embodiment of this invention; and FIGURES 8 and 9 are still further partially sectional views in elevation and partially schematic views illustrating additional apparatus of further embodiments of this invention.

Referring to the drawings a suitable form of a blank 1 is shown in FIGURE 1 and includes a particular configuration of internally unjoined or partially laminated area 2 which extends to a peripheral edge of the blank at 3. The unjoined area is contained between solid portions 4 and 5. Although the simplest of configurations has been illustrated in FIGURE 1, the hollow or partially laminated blank contemplated to be fabricated in accordance with this invention can be expanded from various suitable blanks such as that disclosed in the aforesaid U.S. Patent No. 2,690,002 and can be of any shape such as a flat or curved sheet, a cup, a cone or other surface of revolution. For a specific example, a 0.060 inch thick blank having a more complex system of unjoined areas or laminations was fabricated from 1100 type aluminum containing a system of passageways ⅜ inch in width. The laminations in this blank can be spaced an equal distance from the faces of the blank so that the complementary portions of the blank adjacent the unjoined area are each 0.030 inch thick. This blank, an equivalent of the blank illustrated in FIGURE 1, can then be placed on the flat shaped surface 6 or a die 7.

Die 7 has extending from its lower surface an integral piston 8 received in a bore or piston chamber 9 of a hydraulic cylinder 10. Activation of die 7 is obtained by a fluid pressure injected into piston chamber 9 of hydraulic cylinder 10 by means of a fluid conduit 11 connected at one end in communicating relationship with piston chamber 9 and at its other end to a common fluid conduit 12. Fluid conduit 12 is provided sequentially with a pressure switch 13, a valve 14, a check valve 15 and a pressure regulator 16. As illustrated, valve 14 is placed between complementary fluid conduit portions 87 and 88 of fluid conduit 11. Venting for piston chamber 9 is accomplished by means of a conduit 17 connected at one end into fluid conduit 11 at any point adjacent hydraulic cylinder 10. Fluid conduit 17 also exhausts into the atmosphere through a manually operated valve 18. However, it is to be understood that piston chamber 9 may be vented by conduit 17 so as to return the source of high pressure fluid 19. The common fluid conduit 12 is connected to a source of high pressure fluid 19.

Pressure regulator 16 reduces the pressure level conduit 12 to an appropriate pressure required for operating die 7, for example 3,000 p.s.i. (pounds per square inch) for purposes of the above-referred-to specific example and hereinafter referred-to as "the specific example."

Valve 14 is maintained normally in a closed position, between complementary fluid conduit portions 87 and 88 of fluid conduit 11 until actuated by solenoid 20 which simultaneously closes a normally open electric switch 21. Solenoid 20 is grounded at one end 22 and is connected at the other end through a common juncture 23 to a terminal 24 of a manually operated push button switch 25. The other terminal 26 of push button 25 is connected through a common juncture 27 to a source of electrical energy. Electrical switch 21 has one terminal 35 connected to common juncture 23 and has its other terminal 36 connected through a terminal 28 to an electric switch 29 normally in a closed position until actuated into the open position by solenoid 30, which is connected at one end to a ground 31 and at its other end by means of an electric conduit 32 to a common juncture 33. The other terminal 34 of electrical switch 29 is connected to juncture 27, which with terminal 26 of push button 25 is connected to any appropriate source of electrical energy.

Pressure switch 13, in fluid conduit 11, is a conventional electrical type of switch adapted to provide a momentary means of transmitting an activating signal and has one terminal connected through an electrical conduit 37 to a source of electrical energy with its other terminal connected by means of an electric conduit 38 to a common juncture 39. Pressure switch 13 is preset so as to be activated at a predetermined die closing fluid pressure in conduit 11 or piston chamber 9, for example 2,500 p.s.i. in order to electrically energize the circuit through juncture 39 for the specific example.

Fixedly mounted against movement above die 7 and panel 1 is an upper die 40 having in its lower face a suitable chamber or cavity 41. An integral peripheral ridge 42 surrounds die recess or cavity 41 and is provided in its lower surface 43 with a suitable sealing means such as an O-ring 44 for fluid-tight engagement with the top surface of partially laminated blank 1 upon raising die 7 from its open to its closed position. Die 40 is adapted for injection of a fluid pressure therein by means of a fluid conduit 45 in communicating relationship with die chamber or cavity 41. The other end of fluid conduit 45 is connected through a momentary contact pressure switch 46, valve 47, check valve 48 and pressure regulator 49 to a header conduit 50, which header conduit is in turn connected into the common conduit 12. Pressure regulator 49 reduces the level of the fluid pressure from header conduit 50 to the desired blank-holding fluid pressure, such as 850 p.s.i. for the specific example, into the die chamber or cavity 41 to hold blank 1 down against the shaped surface 6 of die 7.

Valve 47 is a three-way valve normally maintaining a closed position between complementary fluid conduit portions 89 and 90 of fluid conduit 45 and also normally maintaining complementary fluid conduit portion 89 in communicating relationship with vent conduit 52 until actuated by solenoid 51. In its normal position valve 47 maintains die cavity or recess 41 vented to the atmosphere, drain or to any appropriate means returning fluid back to the source of high fluid pressure 19. Upon actuation of solenoid 51, valve 47 establishes a closed relationship between the complementary fluid portion 89 and vent conduit 52, and places complementary fluid portions 89 and 90 in communicating relationship with one another.

Solenoid 51 simultaneously with the actuation of valve 47 also closes an electrical switch 53 normally in the open position. Solenoid 51 is further connected at one end to a ground 54 and at its other end through a common juncture 39, electrical conduit 38 to pressure switch 13. One terminal 55 of electrical switch 53 is also connected to common juncture 39 and the other terminal 56 is connected by an electrical conduit 57 to a terminal 58 of electrical switch 59 whose other terminal 60 is connected to a source of electrical energy. Switch 59 is normally maintained in a closed position until actuated into an open position by means of a solenoid 61 having one end grounded at 62 and its other end connected through an electrical conduit 63 to a juncture 33.

As indicated above, fluid conduit 45 is also provided with a momentary contact pressure switch 46. This pressure switch 46 is adapted to be actuated in response to a predetermined pressure level, such as 850 p.s.i. for purposes of the specific example, to activate a delay timer 64 adapted to transmit a signal after a predetermined time delay, for example 3 seconds for purposes of the specific example, to provide a source of electrical energy through an electrical conduit 65 to solenoid 66. Also, as the pressure in die chamber 41 builds up to 850 p.s.i., the die-closing pressure reaches its maximum pressure of 3000 p.s.i.

A blank-inflation fluid is applied internally of blank 1 by means of a fluid conduit 67 connected at one end in communicating relationship with the laminations or unjoined areas 2 of blank 1 and at its other end through a momentary contact switch 68, valve 69, check valve 70, and pressure regulator 71 to header conduit 50. Pressure regulator 71 reduces the level of high pressure in header conduit 50 to the pressure level desired for inflation of blank 1, such as 2800 p.s.i. for purposes of the specific example. Valve 69 is adapted to control a flow of fluid between complementary portions 91 and 92 of fluid conduit 67 and a vent conduit 72 which may be vented to the atmosphere or to an appropriate means to return the blank-expanding fluid back to the source of high pressure fluid 19. Normally valve 69 is maintained in a closed position relative to the complementary portions 91 and 92 of fluid conduit 67 with complementary portion 91 in communicating relationship with vent 72 until actuated by solenoid 66 which simultaneously closes a normally open switch 73.

Solenoid 66 is grounded at one end 74 and connected at the other end through a common juncture 75 to the electrical conduit 65. Switch 73 has one terminal 76 connected to common juncture 75 and its other terminal 96 connected through an electrical conduit 77 to a terminal 78 of an electrical switch 79 normally maintained in the closed position until actuated by solenoid 80. The other terminal 81 of electric switch 79 is connected through an electrical conduit 82 to a source of electrical energy. Solenoid 80 is adapted to be activated by having its one end grounded at 83 and its other end connected through an electric conduit 84 to a common juncture 33.

The momentary contact pressure switch 68, in fluid conduit 67, is adapted to be actuated at a predetermined pressure level, such as 2800 pounds for purposes of the specific example, to energize a delay timer 85, which after a predetermined time delay, for example 10 seconds for purposes of the specific example, provides a source of electrical energy through electrical conduit 86 to the common juncture 33.

In operation with valve 18 in vent conduit 17, in the closed position, blank 1 and particularly the 1100 type aluminum blank of the specific example referred to above, is placed on the shaped surface 6 of die 7. Thereafter, the functions of the apparatus are initiated by manually depressing push button switch 25 which energizes solenoid 20 to open valve 14 and to close the electrical switch 21. Solenoid 20 is kept energized by means of the normally closed pressure switch 29 so as to maintain a complete circuit with a source of electrical energy at juncture 27 and ground 22. With valve 14 in the open position, a die-closing pressure reduced to a desired level, such as 3,000 p.s.i. for the specific example, by means of pressure regulator 16, is injected into piston chamber 9 to urge piston rod 8 together with die 7 upwardly into the closed position whereat blank 1 is placed therebetween in sealing relationship with die recess or cavity 41 by means of the O-ring 44. When the die-closing pressure in piston chamber 9 reaches a predetermined level, for example 2,500 p.s.i. for the specific example, pressure switch 13 is momentarily actuated to energize solenoid 51 to close the complementary fluid conduit portion 89 relative to vent conduit 52 and to place it in communicating relationship with complementary fluid conduit portion 90 and header conduit 50 while simultaneously closing switch 53. With the closure of switch 53, a complete electrical circuit is established between ground 54 and source of electrical energy, at terminal 60 of switch 59, to maintain solenoid 51 activated until the circuit is broken upon energization of solenoid 61.

With the complete fluid conduit 45 placed in communicating relationship with header 50, a blank-holding pressure reduced to an appropriate pressure level by means of pressure regulator 49, such as 850 p.s.i. for purposes of the specific example, is injected into die chamber or cavity 41. As the fluid pressure in die chamber or cavity 41 rises to a predetermined level, such as 850 p.s.i. for the specific example, pressure switch 46 is momentarily actuated to activate the delay timer 64. Upon completion of its delay cycle of a predetermined time interval, such as 3 seconds for the specific example, delay timer 64 is adapted to provide electrical energy through conduit 65 and juncture 75 to solenoid 66.

The delay timer is particularly employed in the preferred embodiment of this invention since it provides three distinct advantages. It eliminates the effects of any pressure surges in any of the fluid conduits inclusive of any surges in the source of high pressure fluid; it gives sufficient time for the blank-holding pressure to build-up so as to eliminate effects of the pressures in the fluid conduits as opposed to the pressure in die recess or cavity 41 and it provides sufficient time so as to allow heavy gauge metal blanks to be moved and held firmly in intimate contact with the shaped surface 6 of die 7.

Upon energization of solenoid 66, valve 69 is actuated so as to place complementary fluid conduit portion 91, of fluid conduit 67 in communicating relationship with header conduit 50 through the complementary fluid conduit portion 92 while simultaneously closing the electrical switch 73. Valve 69 is a three-way valve which normally maintains the complementary portions of fluid conduit 67 closed relative to header conduit 50 and maintains the complementary portion 91 of fluid conduit 67 adjacent blank 1 in communicating relationship with vent conduit 72.

Subsequent to the actuation of valve 69, the valve is maintained in its activated position by means of a complete electrical circuit being established through solenoid 66, switches 76 and 79. With the complementary fluid conduit portions 91 and 92 in communicating relationship with each other, a blank-expanding pressure reduced by means of pressure regulator 71 to a desired blank-expanding pressure level, such as 2,800 p.s.i. for the specific example, is applied into the unjoined portions or laminations 2 of blank 1. As the blank-expanding pressure rises to a predetermined pressure level, such as 2,800 p.s.i. for the specific example, a pressure switch 68 preset to be actuated at the predetermined blank-expanding pressure level provides a momentary activation of delay timer 85 which after a predetermined time interval, such as 10 seconds for the specific example, is adapted by means such as an appropriate internal switch to transmit an electrical impulse in conduit 86 to its juncture 33. It is to be understood that the blank-holding pressure in die chamber 41 is preferably maintained at constant pressure, for example 850 p.s.i., by means of suitable pressure relief valves not shown but readily apparent to those skilled in the art.

The time interval at which delay timer 85 is preset provides distinct advantages in the expansion of the hollow or partially laminated blank 1 by eliminating effects of surges throughout the fluid conduits. In addition, as discussed previously, since a partially laminated pressure-welded blank has a tendency for the laminations or unjoined portion 2, of blank 1, to be lightly tacked the laminations require a certain pressure level to break their area loose. In the absence of the delay period preset in the delay timer 85, the desired pressure level would be reached before blank 1 would be fully expanded. The same advantages of this invention are also provided where the design of the partial laminations or unjoined area contains very narrow or restricted areas through which the blank-expanding fluid pressure must go through. The specific length of time in which the blank-expanding fluid pressure is required to be applied within the partially laminated blank 1 can be readily determined by one skilled in the art bearing in mind the single criterion that the application of the blank-expanding fluid pressure is to be applied for a sufficient length of time to give all laminations or unjoined areas 2 of blank 1 a chance to expand to a uniform height. All that is required is to permit the high pressure to build-up throughout the hollow interior of blank 1 for a sufficient length of time to fully expand the panel uniformly.

A section of the apparatus with the blank in its expanded configuration is illustrated in FIGURE 3. As can be seen by reference to this figure, the die recess 41 with the blank-expanding fluid pressure therein and having a flat upper surface at a height from the upper face of the blank at a distance equal to the desired expanded height of the unjoined portions contained within the blank. The blank-expanding fluid pressure holds the lower face of the blank firmly and intimately with the shaped surface 6 of die 7. Upon application of the blank-expanding fluid pressure within unjoined portions or laminations 2 of blank 1, this pressure acting in combination with the blank-holding pressure applied externally of the blank expands the unjoined portions or laminations 2 until they are flattened against the top of the die recess 41. The resultant shaped panel 93 is provided with flat top bulges 94 to define an internal system of passageways 95 corresponding to the pattern of unjoined portions or laminations 2 previously contained within blank 1.

When delay timer 85 transmits the electrical impulse to juncture 33, the impulse is in turn transmitted through electrical conduits 32, 63 and 84 to simultaneously activate solenoids 30, 61 and 80, respectively. When solenoid 30 is activated, it opens electrical switch 29 permitting switch 21 to open and valve 14 to close. Upon activation of solenoids 61 and 80, valves 47 and 69 are returned to their normal position to vent die cavity 41 and the interior of blank 1 to the atmosphere to thus simultaneously release the pressures therein. Upon release of fluid pressures within die recess 41 and that employed for expanding blank 1, valve 18, in vent conduit 17 is then manually opened to return die 7 to its open position so as to separate it from die 40 for removal from the expanded panel.

Although a specific combination of pressure levels has been employed, it is to be understood that various pressure levels, both internally and externally of the partially laminated blank, and various pressure level differentials are contemplated and may be varied in accordance with the type of blank employed, the thicknesses of the blank, the degree of distention or expansion desired and the shape and configurations of the distentions to be produced. In accordance with the concept of this invention, the operator need merely to make the necessary variations and adjustments until the desired distentions are obtained. The best results are obtained for each blank with the desired configuration of the passageways and the height of the distention at some particular combination of internal and external pressures and the length of time for the application of these pressures to be determined in each instance by the operator for the specific blank and its intended application.

Also, although the preceding example has been described with respect to a simultaneous release of its blank-holding and blank-expanding pressures, it is preferred that the release of these two pressures to be controlled so that a balance or specific ratio is maintained between the venting of the blank-holding and blank-expanding pressures so that the difference between them will not be greater than the bulging pressure of the blank and the collapsing pressures of the desired expanded configuration. In accordance therewith, the blank-holding pressure cannot exceed the blank expanding pressure by a quantity equivalent to the collapsing pressure of the tubes, and the blank-expanding pressure cannot exceed the blank-holding pressure by a quantity equivalent to the bulging pressure of the panel. The bulging pressures and the collapsing pressures can be readily determined by the operator for each type of blank employed. For example, with reference to the specific example which employed a 0.060 inch thick blank of 1100 type aluminum containing a ⅜ inch circuity, bulging of these units will occur at about 140 p.s.i. and collapsing of the resultant expanded passageways will occur at about 350 p.s.i. Therefore, for this specific blank, the blank-holding pressure should not be permitted to exceed the blank-expanding pressure by this 350 p.s.i. bulging value. Also, the blank-expanding pressure should not exceed the blank-holding pressure by 150 p.s.i. when the die pressure has been relieved to a level no longer sufficient to hold the expanded blank in the desired contact with the shaped surface 6 of die 7. The rates at which the blank-holding and blank-expanding pressures are being exhausted do not have to be fixed. It is only necessary that they be kept in balance sufficient that the above referred-to conditions are met. The desired expanded configuration is obtained when the above conditions are met wherein the blank-holding and blank-expanding pressures are released at a rate so that at their discharge a difference between them is maintained between the bulging pressure of the unit and the collapsing pressures of the distended system of passageways. One system in which these conditions can be maintained is illustrated in FIGURE 4.

The apparatus illustrated in FIGURE 4 employs basically the same inflating apparatus described with reference to FIGURE 2 with the exception that an appropriate vent control 97 is connected across vent conduits 72 of valve 69 and vent conduit 52 of valve 47. This vent control 97 consists of a passage 98 in communicating relationship with vent conduit 72, and opening into a bore or chamber 99 provided at its other end with a screwedly attached adjusting plug 100. The vent control is also provided with a ball check 101 normally engaging a conical seat 102 in the wall portion 103 to normally close the vent control against escape of the blank-expanding pressure, within the blank, unless this pressure exceeds a predetermined level. The desired pressure level is maintained within the blank by means of a vented follower 104 and a coil spring 105 mounted in a bore 106, of the vent control, to act with adjustable compression on ball check 101 by means of adjusting plug 100. Adjusting plug 100 is provided with a suitable slotted end portion 107 for engagement by a suitable tool in order to adjust the desired pressure levels. A suitable conduit 108 is connected at one end in communicating relationship with bore 106 of the vent control and at its other end in communicating relationship into vent 52 of valve 47.

At the conclusion of the expanding operations, the valves 47 and 69 are returned to their normal position. The discharging blank-holding pressure supplements the compressive action of spring 105 on follower 104 to urge ball check 101 under a greater pressure into sealing relationship against conical seat 102. In this manner, the blank-expanding pressure is not permitted to escape until the released blank-holding pressure falls to a predetermined level. As will be obvious, fluctuations between the blank-holding and blank-expanding pressures from the desired relation between them will be prevented automatically by the action of this valve control means. Although in the specific embodiment illustrated in FIGURE 4, the discharge of the blank-expanding pressures is controlled by the control means 97 in conjunction with the discharge of the venting pressures in vent conduit 52, the control means illustrated in FIGURE 4 may also be employed to control the rate of discharge of the blank-holding pressures where the specific expanding operations so dictate.

FIGURE 5 illustrates another form of controlling the rates of discharge of the blank-holding and blank-expanding pressures in conjunction with another embodiment of this invention. This embodiment distinguishes from the preceding ones by substituting for pressure switch 68 in blank-expanding fluid conduit 67 a plurality of delay timers 109 and 110 operatively connected in the expanding apparatus. As previously, delay timer 64, actuated in response to a predetermined pressure level in die cavity 41, after a predetermined time delay activates solenoid 66 to actuate valve 69 and maintains the valve in its operative blank-expanding position and simultaneously closes electric switch 73. Simultaneously with the actuation of valve 69, after delay timer 64 has run its time cycle, timers 109 and 110 are also actuated by being operatively connected at junctures 111 and 112, respectively, in the electric conduit 65. Each of the timers 109 and 110 are preset to provide an electric signal independently from each at different times to activate solenoids 61 and 80 independently.

The embodiment of FIGURE 5 also distinguishes over preceding embodiments in that solenoid 30 is activated by a momentary signal from pressure switch 13 simultaneously with valve 47 so as to close valve 14 at the same time that valve 47 is actuated. This is accomplished by operatively connecting the solenoid 30 at juncture 113 in electrical conduit 38. Thus, when pressure switch 13 transmits a momentary signal to electrical conduit 38, the solenoid 30 is activated to open switch 29 to break the electrical circuit to solenoid 20 opening switch 21 and closing valve 14. The hydraulic pressure in piston chamber 9 is then maintained until released by opening valve 18.

Where the blank-holding pressure is to be released first, delay timer 110 is preset to transmit a signal prior to delay timer 109. Upon transmission of the signal from timer 110 to solenoid 61, switch 59 is opened to permit the activation of solenoid 51 to result in opening switch 53 and returning valve 47 to its normal position so as to vent the blank-holding pressure through vent 52. However, in order to control the relationship between the rate at which the blank-holding pressure is discharged and the subsequent rate of discharge of the blank-expanding pressure through vent 72, both vent conduits 52 and 72 are provided with control orifices 114 and 115, respectively, of a diameter having predetermined relationship to the rates of discharge desired between the fluid pressures. Orifice 114 and timer 109 are so coordinated that when the pressure level of the blank-holding pressure falls a predetermined degree at the end of a predetermined time interval, delay timer 109 will at that time transmit a signal of activate solenoid 80 to actuate valve 69 into its normal position to begin relieving of the blank-expanding pressures. With valves 47 and 69 in their normal positions, the sizes of the orifices 114 and 115 permit the evacuation of the blank-holding and blank-expanding pressures at a desired relationship between each other. A specific relationship of the sizes of orifices 114 and 115 and the desired time interval in timer 109 can be readily determined by considerations well known in the art.

Each of the preceding embodiments employed control means for automatically releasing only the blank-holding and blank-expanding pressures retaining the hydraulic pressure in piston chamber 9 to maintain dies 7 and 40 in the closed position. However, the embodiment of FIGURE 5 denotes additional control means by means of a broken line for automatically relieving the hydraulic pressures in piston chamber 9. This may be accomplished by adding an additional delay timer 116, operatively connected to valve 18 and adapted to be activated by a signal from delay timer 64. Delay timer 116 is preset so as to transmit a signal after a time interval sufficient to insure a complete exhausting of the blank holding and blank-expanding pressures. Thus, when delay timer 116 transmits the signal to open valve 18, vent conduit 17 exhausts the die closing pressures in piston chamber 9 to return die 7 to its open position for removal of the blank.

Use of the control means to maintain a desired relationship between the rates of discharge of the blank-holding and blank-expanding pressures permits the fabrication of a novel blank in accordance with another aspect of this invention which will be described with reference to the apparatus of FIGURE 2 employing the control means 97 illustrated in FIGURE 4. In the fabrication of this novel panel, the control means is adjusted by means of slotted adjusting plug 100 to permit the release of the blank-holding pressure to be maintained at a magnitude so that a certain amount of tube height can be expanded on the face of the blank adjacent the shaped surface 6 of die 7. This tube height is controlled by maintaining a specific relationship between the discharge of the blank-holding and blank-expanding pressures. In accordance with this invention, it was found by maintaining this relationship, the web portions of blank 1 intermediate tubular configurations were also bulged out of the face and to the same height as the face of the blank adjacent the shaped surface 6 of die 7. With reference to the specific example employing the 0.060 inch thick blank of 1100 type aluminum, the blank-holding pressure employed was 300 p.s.i. with the rates of discharge maintained so that no additional bulging of the panel took place and no collapsing of the expanded blank took place. This novel expanded panel 117 is illustrated in FIGURE 6 in which the blank-holding pressure 300 p.s.i. applied through fluid conduit 89 acts against the blank. A blank-expanding pressure of 2,800 p.s.i. is shown applied internally of the blank to accomplish expansion while the blank-holding pressure is applied externally of the blank. This relationship of pressures maintains and reshapes the expanding blank in such a way to provide a fully expanded distention 118 out of the face adjacent die recess 41 and a partially expanded distention 119 of a substantially lesser degree than distention 118 out of the face of the blank adjacent shaped surface 6 of die 7. In addition, the portions of the panel between the laminations of the blank are deformed out of the face of the blank adjacent shaped surface 6 of die 7 into bulges 120 to extend out of the plane of panel 117 to the same degree as the partially expanded distention of distention 118.

Although the fabrication of this novel blank has been described in relation with the application of a blank-holding pressure contained within a cavitated die, it is to be understood that this blank can also be obtained by use of appropriately recessed dies in accordance with the teachings of the aforesaid U.S. Patent 2,690,002. Where the recess dies of the aforesaid patent are employed, the faces of each die are appropriately contoured to provide the desired configuration of this novel blank.

This novel panel having web portions bulged out of the same face and to the same height as the tubular distentions expanded to substantially lesser degree than the distentions out of the other face of the panel provide desired advantages over prior type structures. This novel panel provides increased volumes over an expanded panel having one face substantially unexpanded and in addition increases the contact area of the partially deformed face of the panel so as to provide an increased supporting surface while simultaneously reducing the susceptibility to damage from structures placed thereon.

In the absence of the deformed web portions, prior art panels employed as a refrigerator evaporator panel were susceptible from damage to articles such as food and ice cube containers placed thereon. For example, with respect to ice cube trays to enter the space between adjacent distended passageways so as to collide against one of the passageways. Such collisions can result in the deformation of the expanded passage so as to restrict the flow of refrigerant fluid therein decreasing the efficiency of the evaporator. Also, where the accumulated frost on the evaporator is desired to be removed by means such as a scraper, a panel, without the bulged portions is susceptible to puncture by the scraper entering the space between the distended passageways and hitting against one of the distended passages. Such puncture practically destroys further use of the panel until repaired. However, with the deformed web portions of the panel of this invention bulged out of the face to be used as a supporting surface, these bulged web portions provide not only an additional contacting surface for support but in addition provide a desired means to deflect an approaching object so as to reduce the susceptibility to damage.

FIGURE 7 illustrates still another embodiment of this invention of expanding a partially laminated blank similar to that depicted in FIGURE 2 with the exception that pressure switch 68 and timer 85 are substituted by a delay timer 121 adapted to transmit a series of signals at desired predetermined time intervals after an initial time delay. In this embodiment, pressure switch 46 momentarily activates timer 121 to actuate, after a predetermined time delay, valve 69 and close electric switch 73 so as to inject a blank-expanding pressure into the laminations 2 of blank 1. However, in this embodiment, delay timer 121 is also adapted to transmit a second signal after a predetermined time interval subsequent to the transmission of the first signal to activate solenoids 30, 61 and 80 to return valves 14, 47 and 69, respectively, to their normal position which relieves the blank-holding and blank-expanding pressures through vent conduits 52 and 72, respectively. The delay desired in delay timer 121 can be readily determined by the operator to insure a uniform expansion of the laminations within blank 1.

FIGURE 8 illustrates a still further embodiment of this invention similar to that of FIGURE 7 from which automatically actuated valve 14 and manually actuated valve 18 are substituted by a single automatically actuated valve 122. Valve 122 distinguishes from the previous valves in maintaining its normal position complementary fluid conduit 87 of die closing fluid conduit 11 closed with respect to the complementary fluid conduit portions 88 of fluid conduit 11 and maintains complementary fluid conduit portion 87 in cooperating relationship with vent conduit 123. Upon energization of solenoid 20, valve 122 is actuated to close complementary conduit portion 87 with respect to venting conduit 123 and to place it in cooperating relationship with its complementary conduit portion 88. This relationship is maintained by the simultaneous closing of electric switch 21. At the completion of the expansion of blank 1, valve 122 is returned to its normal position by the secondary signal of delay timer 121 as in the apparatus of FIGURE 7. This embodiment, of FIGURE 8, provides a simultaneous release of all the applied pressures; die-closing, blank-holding and blank-expanding pressures.

A still another embodiment of this invention is shown in FIGURE 9 which is similar to the preceding embodiment with the exception that it employs two delayed time relays 64 and 124 in place of a single relay 121. As in the preceding embodiment delay timer 64 is actuated by pressure switch 46 and a predetermined blank-holding pressure to transmit a signal after a predetermined time delay to activate solenoid 66 for actuation of valve 69 and to activate the second timer 124 which after a predetermined time delay transmits a signal to solenoids 20, 61, and 80 to return valves 122, 47, and 69 simultaneously to their normal position.

Although the invention has been described with reference to specific embodiments, materials and details, various modifications and changes, within the scope of this invention, will be apparent to one skilled in the art and are contemplated to be embraced within the invention.

What is claimed is:

1. An apparatus for fabricating a hollow panel by expansion of a blank having an unjoined interior portion contained within outer faces of said blank comprising a pair of dies relatively movable between open and closed positions, said dies being adapted to receive said blank in the open position and to limit the outer expansion thereof in the closed position, one of said dies having a recess therein adjacent one face of said blank and adapted to be placed in sealing relationship with said blank when said dies are in a closed position, said recess being deep enough to limit the expansion of said blank to a predetermined height, the other of said dies being substantially smooth for contiguous engagement with the other face of said blank, closure means for opening and closing said dies, a blank-holding conduit connected to said recess to transmit blank-folding fluid thereinto, an expansion conduit means adapted for connection to said blank for injecting a blank-expanding fluid into said unjoined portion, activating means to operate said closure means to close said dies above a predetermined pressure level, means operating in response to a predetermined pressure level of said dies to inject blank-holding fluid through said recess conduit means into said recess at a predetermiend blank-holding pressure, programming means responsive to a predetermined blank-holding pressure for transmitting a signal after a predetermined time delay, means responsive to said signal to supply blank-expanding fluid pressure into the unjoined portions of said panel, and means responsive to a predetermined blank-expanding pressure to release said blank-holding and blank-expanding pressures.

2. An apparatus for fabricating a hollow panel by expansion of a blank having an unjoined interior portion contained within outer faces of said blank comprising a pair of dies relatively movable between open and closed positions, said dies being adapted to receive said blank in the open position and to limit the outer expansion thereof in the closed position, one of said dies having a recess therein adjacent one face of said blank and adapted to be placed in sealing relationship with said blank when said dies are in a closed position, said recess being deep enough to limit the expansion of said blank to a predetermined height, the other of said dies being substantially smooth for contiguous engagement with the other face of said blank, hydraulic means for moving one of said dies between open and closed positions, a die conduit means connected to said hydraulic means for injecting fluid pressure thereinto to move said dies into the open and closed positions, a blank-holding conduit means connected to said recess to inject blank-holding fluid pressure thereinto, an expansion conduit means adapted for connection to said blank for injecting a blank-expanding fluid into said unjoined portion, activating means to inject die-closing fluid through said die condut means to operate said hydraulic means at a predetermined pressure level sufficient to colse said dies, means operating in response to a predetermined pressure level of said die-closing fluid to inject blank-holding fluid through said recess condiut means into said recess at a predetermined pressure, means operating in response to a predetermined pressure of said blank-holding fluid to inject a blank-expanding fluid pressure into the unjoined portion of said panel, programming means responsive to a predetermined blank-expanding pressure for transmitting a signal after a predetermined time delay and means responsive to said signal to release said blank-holding and blank-expanding pressures.

3. An apparatus for fabricating a hollow panel by expansion of a blank having an unjoined interior portion contained within outer faces of said blank comprising a pair of dies relatively movable between open and closed positions, said dies being adapted to receive said blank in the open position and to limit the outer expansion thereof in the closed position, one of said dies having a recess therein adjacent one face of said blank and adapted to be placed in sealing relationship with said blank when said dies are in a closed position, said recess being deep enough to limit the expansion of said blank to a predetermined height, the other of said dies being substantially smooth for contiguous engagement with the other face of said blank, hydraulic means for moving one of said dies between open and closed positions, a die conduit means connected to said hydraulic means for injecting fluid pressure thereinto to move said dies into the open and closed positions, a blank-holding conduit means connected to said recess to inject blank-holding fluid pressure thereinto, an expansion conduit means adapted for connection to said blank for injecting a blank-expanding fluid into said unjoined portion, activating means to inject die-closing fluid through said die conduit means to operate said hydraulic means at a predetermined pressure level sufficient to close said dies, means operating in response to a predetermined pressure level of said die-closing fluid to inject blank-holding fluid through said recess conduit means into said recess at a predetermined pressure, programming means responsive to a predetermined blank-holding pressure to transmit after a predetermined time delay a series of signals at predetermined time intervals, means responsive to one of said signals to supply blank-expanding fluid into said unjoined portions, and means responsive to a subsequent signal after said one signal of said programming means to release said blank-holding and blank-expanding pressures.

4. The apparatus of claim 3 including ratio means operatively connected in communicating relationship with said blank-holding and blank-expanding pressures to release said blank-holding and blank-expanding pressures at a rate so that during discharge the difference between said blank-holding pressure and said blank-expanding pressure is maintained between the bulging pressure of said blank and the collapsing pressure of the expanded unjoined portion.

5. An apparatus for fabricating a hollow panel by expansion of a blank having an unjoined interior portion contained within outer faces of said blank comprising a pair of dies relatively movable between open and closed positions, said dies being adapted to receive said blank in the open position and to limit the outer expansion thereof in the closed position, one of said dies having a recess therein adjacent one face of said blank and adapted to be placed in sealing relationship with said blank when said dies are in a closed position, said recess being deep enough to limit the expansion of said blank to a predetermined height, the other of said dies being substantially smooth for contiguous engagement with the other face of said blank, hydraulic means moving one of said dies between open and closed positions, a die conduit means connected to said hydraulic means for injecting fluid pressure thereinto to move said dies into the open and closed positions, a blank-holding conduit means connected to said recess to inject blank-holding fluid pressure thereinto, an expansion conduit means adapted for connection to said blank for injecting a blank-expanding fluid into said unjoined portion, activating means to inject die-closing fluid through said die conduit means to operate said hydraulic means at a predetermined pressure level sufficient to close said dies, means operating in response to a predetermined pressure level of said die-closing fluid to inject blank-holding fluid through said recess conduit means into said recess at a predetermined pressure, a first programming means responsive to a predetermined blank-holding pressure for transmitting a first signal after a predetermined time delay, means responsive to first said signal to supply blank-expanding pressure into said unjoined portion, a second programming means responsive to said first signal to transmit a second signal after a predetermined time delay, and means responsive to said second signal to release said blank-holding and blank-expanding pressures.

6. An apparatus for fabricating a hollow panel by expansion of a blank having an unjoined interior portion contained within outer faces of said blank comprising a pair of dies relatively movable between open and closed positions, said dies being adapted to receive said blank in the open position and to limit the outer expansion thereof in the closed position, one of said dies having a recess therein adjacent one face of said blank and adapted to be placed in sealing relationship with said blank when said dies are in a closed position, said recess being deep enough to limit the expansion of said blank to a predetermined height, the other of said dies being substantially smooth for contiguous engagement with the other face of said blank, hydraulic means for moving one of said dies between open and closed positions, a die conduit means connected to said hydraulic means for injecting fluid pressure thereinto to move said dies into the open and closed positions, a blank-holding conduit means connected to said recess to inject blank-holding fluid pressure thereinto, an expansion conduit means adapted for connection to said blank for injecting a blank-expanding fluid into said unjoined portion, activating means to inject die-closing fluid through said die conduit means to operate said hydraulic means at a predetermined pressure level sufficient to close said dies, means operating in response to a predetermined pressure level of said die-closing fluid to inject blank-holding fluid through said recess conduit means into said recess at a predetermined pressure, a first programming means responsive to a predetermined blank-holding pressure to transmit a first signal after a predetermined time delay of at least three seconds, valve means responsive to first signal to supply blank-expanding fluid pressure into said unjoined portion, a second programming means responsive to a predetermined blank-expanding pressure to transmit a second signal after a predetermined time delay of at least 10 seconds, means responsive to said second signal to release said blank-holding and blank-expanding pressures.

References Cited in the file of this patent

UNITED STATES PATENTS

| | | |
|---|---|---|
| 2,656,848 | Noon | Oct. 27, 1953 |
| 2,662,273 | Long | Dec. 15, 1953 |
| 2,690,002 | Grenell | Sept. 28, 1954 |
| 2,749,867 | Engel | June 12, 1956 |
| 2,830,800 | Gerhardt | Apr. 15, 1958 |
| 2,856,164 | Adams | Oct. 14, 1958 |
| 2,866,429 | Staples | Dec. 30, 1958 |
| 2,934,080 | Rice | Apr. 29, 1960 |
| 2,966,730 | Thomas | Jan. 3, 1961 |
| 3,003,228 | Thomas | Oct. 10, 1961 |

OTHER REFERENCES

"Elementary Wiring Diagrams for Machine Analysis," Product Engineering, August 1949.